No. 777,693. PATENTED DEC. 20, 1904.
E. D. PRIEST.
ELECTRIC LOCOMOTIVE.
APPLICATION FILED MAY 6, 1904.
NO MODEL. 3 SHEETS—SHEET 1.
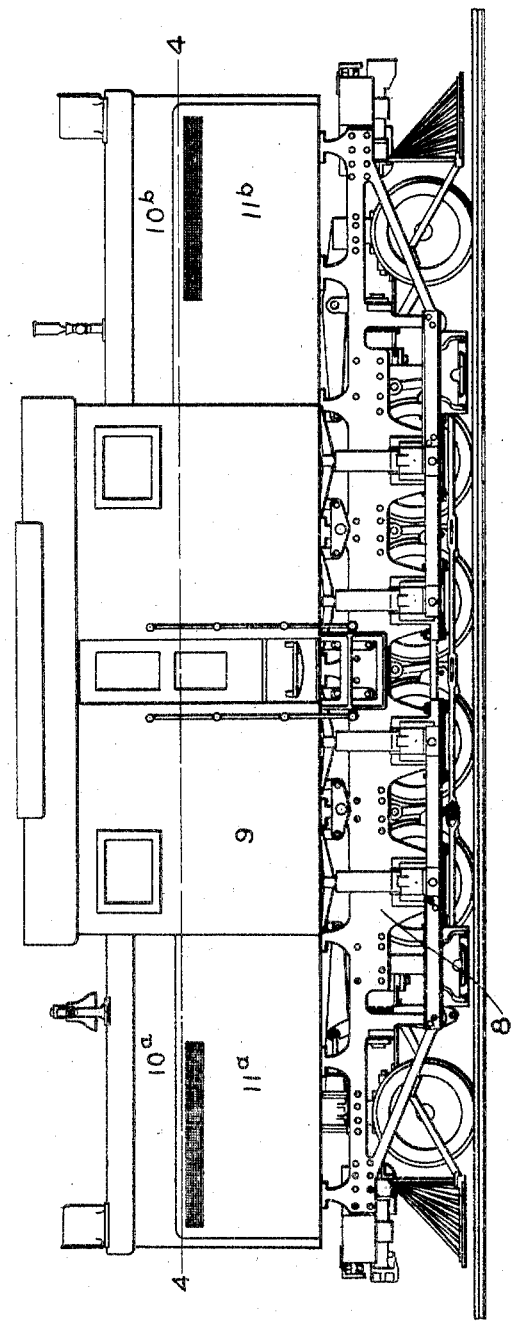
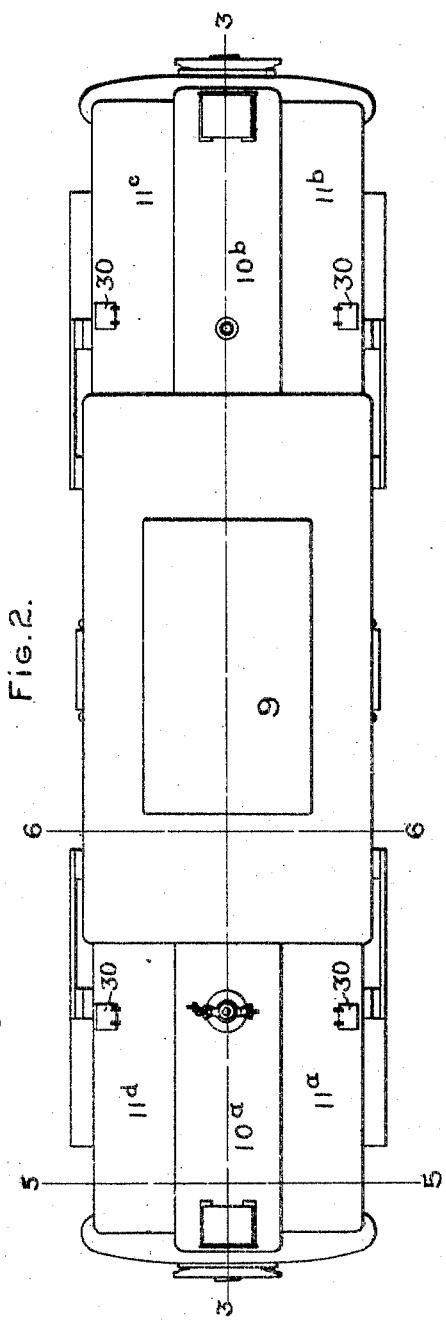
Witnesses:
Inventor.
Edward D. Priest.
By Atty.

No. 777,693. PATENTED DEC. 20, 1904.
E. D. PRIEST.
ELECTRIC LOCOMOTIVE.
APPLICATION FILED MAY 6, 1904.
NO MODEL. 3 SHEETS—SHEET 2.
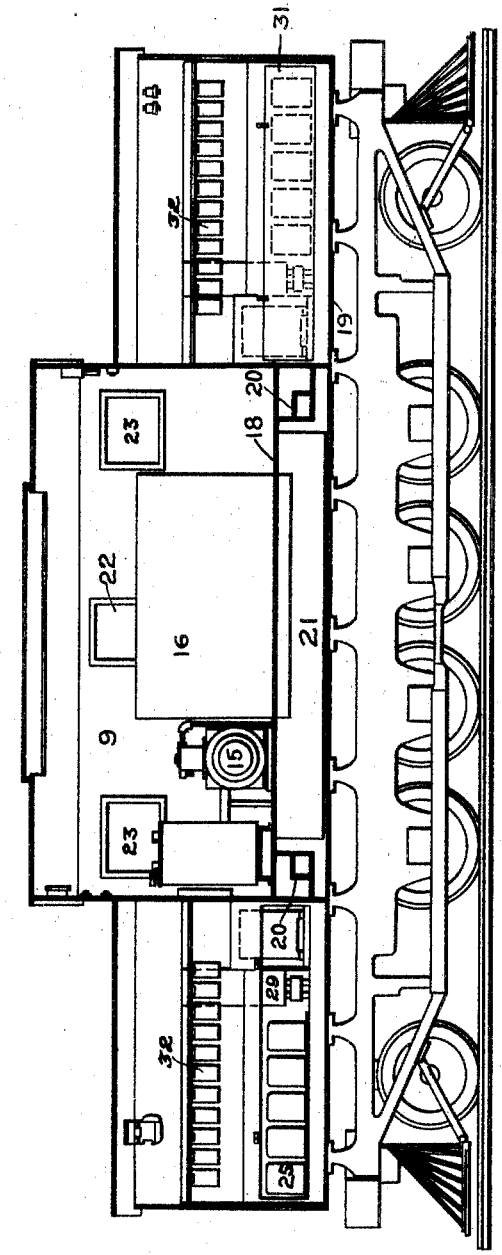
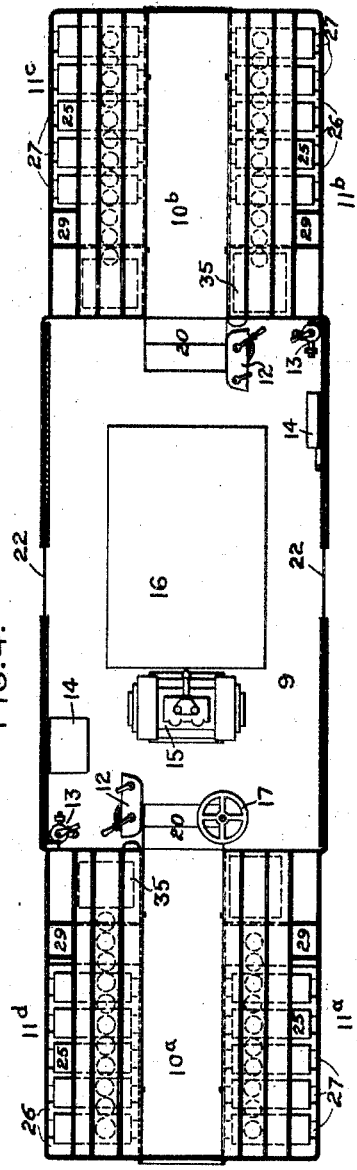
Witnesses:
Inventor:
Edward D. Priest.
By
Att'y.

No. 777,693. PATENTED DEC. 20, 1904.
E. D. PRIEST.
ELECTRIC LOCOMOTIVE.
APPLICATION FILED MAY 6, 1904.
NO MODEL. 3 SHEETS—SHEET 3.

Witnesses:

Inventor.
Edward D. Priest.
By
Att'y.

No. 777,693. Patented December 20, 1904.

UNITED STATES PATENT OFFICE.

EDWARD D. PRIEST, OF SCHENECTADY, NEW YORK, ASSIGNOR TO GENERAL ELECTRIC COMPANY, A CORPORATION OF NEW YORK.

ELECTRIC LOCOMOTIVE.

SPECIFICATION forming part of Letters Patent No. 777,693, dated December 20, 1904.

Application filed May 6, 1904. Serial No. 206,610.

*To all whom it may concern:*

Be it known that I, EDWARD D. PRIEST, a citizen of the United States, residing at Schenectady, county of Schenectady, State of New York, have invented certain new and useful Improvements in Electric Locomotives, of which the following is a specification.

The present invention relates to improvements in electric locomotives, with especial reference to the details of construction and arrangement of the cab.

The main object of my invention is to so organize the cab structure and arrange the controlling apparatus therein that the operator of the locomotive is centrally located while operating the train, has a clear view of the track ahead, and has ready access to all the controlling apparatus and other devices carried by the locomotive without leaving the cab. In this connection it is desirable that the cab be so arranged that when two or more locomotives are coupled together the operator or operators may pass freely from one locomotive-cab to another through covered passage-ways.

A further object is to arrange the sand-boxes of the sanding system so as to utilize some of the waste heat generated by current flowing through the rheostats or resistance-grids to heat and keep dry the sand in said boxes.

The invention therefore consists of an electric locomotive-cab which comprises a central compartment or cab proper in combination with covered end passage-ways leading to said central compartment and smaller compartments on each side of said end passage-ways for containing certain parts of the controlling apparatus, such as rheostats, contactors, &c.

The invention further consists of the combination, in an electrically-propelled vehicle, of a control system for the motors thereof which includes resistance-sections, a compartment in which said resistance-sections are located, and a sand-box in said compartment so arranged as to be subjected to the heat from said resistance-sections.

Figure 5:
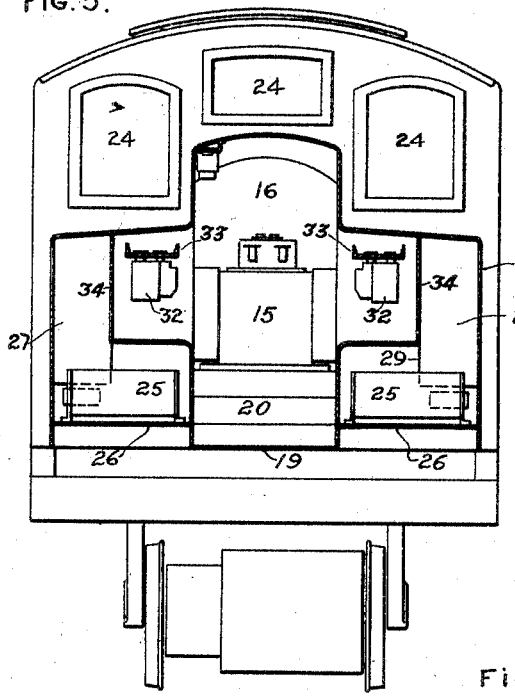
Figure 6:
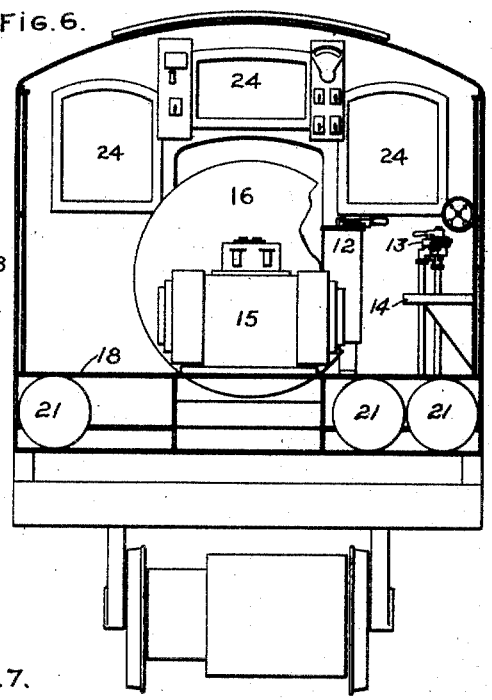
Figure 7:
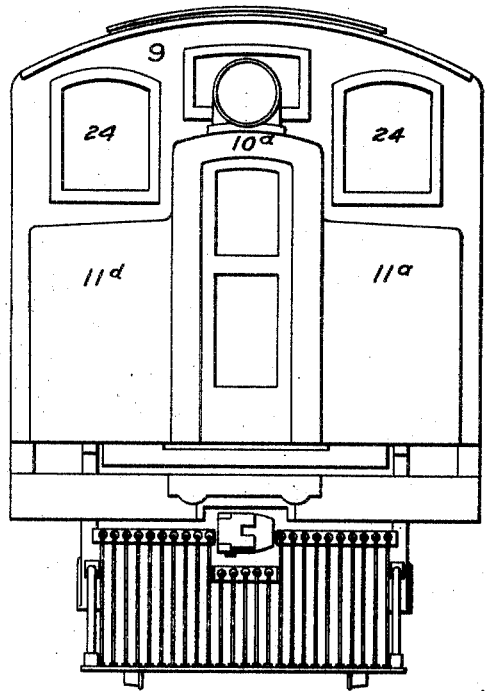

In the accompanying drawings, which illustrate the preferred embodiment of my invention, Figure 1 is a side elevation of the locomotive. Fig. 2 is a top plan view. Fig. 3 is a longitudinal sectional elevation on the line 3 3, Fig. 2. Fig. 4 is a sectional plan view on the line 4 4, Fig. 1. Figs. 5 and 6 are sectional elevations on lines 5 5 and 6 6, respectively, Fig. 2; and Fig. 7 is an end view.

Referring now to the drawings, the truck-frame is represented by 8, the central compartment of the cab by 9, the covered end passage-ways leading to the central compartment by $10^a$ and $10^b$, respectively, and the compartments on each side of said passage-ways by $11^a$, $11^b$, $11^c$, and $11^d$. The end passage-ways are so arranged that when two or more locomotives are coupled together the operators may have an unobstructed covered passage-way from one locomotive-cab to another.

The central compartment or cab proper contains the master-controllers 12 and the air-brake motorman's valves 13 in duplicate, located in diagonally opposite corners. Folding seats 14 are provided for the motorman or operator. The said compartment also contains a motor-driven air-compressor 15 for supplying compressed air to the braking and sanding systems. An electric water heater or boiler 16 is also located in this compartment. This heater is to be employed in furnishing steam for the heating system of the several coaches constituting the train. The brakes may be applied by hand-power, if desired, through the agency of the hand-wheel 17.

The floor 18 of the central compartment is considerably above the floor 19 of the end passage-ways and is reached from said floor 19 by means of the steps 20. The space directly beneath the floor 18 is utilized for containing air-storage tanks 21, cable-boxes, &c. Said compartment is provided with side doors or entrances 22, side windows 23, and end windows 24. The operator, standing upon the raised floor 18 near the controller 12 and looking out through the adjacent end window 24, is able to see completely over the roofs of the covered end passage-way and its side compartments, and is thereby permitted a clear view of the track ahead.

The compartments $11^a$, $11^b$, $11^c$, and $11^d$ on each side of the end passage-ways each contain a plurality of resistance grids or sections 25, mounted on narrow cross-pieces 26, which are raised slightly from the floor 19. An open space is left between the cross-pieces 26 to allow a free circulation of air from below the cab through the chamber containing the resistance-sections through the ventilating-flue 27 and out through the opening 28. This latter opening is preferably covered with gauze. Located partially in these flues and partially in the chambers containing the rheostats are sand-boxes 29, which are so constructed as to utilize the side walls and partitions of these compartments as part of themselves and arranged to be subjected to the heat generated by the current passing through the resistances. The sand in the boxes is thus kept dry without extra heating apparatus. Access to these sand-boxes is had through openings in the roofs of the side compartments. These openings are normally closed by the covers 30. Removable covers 31 are also provided for the front of each of the chambers containing the resistance-grids. The right-hand end of Fig. 3 shows one of these covers in place, and the left-hand end shows the front of the chamber with the cover 31 removed.

The motors are controlled by the so-called "separately-actuated contact or contactor system of control." The power-actuated switches or contactors of this system control the motor and resistance connections and are under the control of the master-controller 12. These contactors 32 are located in the side compartments 11ª, 11ᵇ, 11ᶜ, and 11ᵈ, being suspended from the inverted channel-bar 33 and separated from the rheostat-chamber by the partition 34. The contactors are therefore quite readily accessible for inspection and repairs. Furthermore, power-actuated reversing-switches 35, also under the control of the master-controller 12, are located in these side compartments.

I aim in the appended claims to cover all modifications of my invention which do not involve a departure from its spirit and scope.

What I claim as new, and desire to secure by Letters Patent of the United States, is—

1. In an electric locomotive, a cab comprising a central compartment, covered end passage-ways leading to said central compartment, and smaller compartments in each side of said end passage-ways for containing parts of the controlling apparatus.

2. In an electric locomotive, a cab comprising a central compartment, covered end passage-ways leading to said central compartment, and smaller compartments on each side of said end passage-ways for containing parts of the controlling apparatus, said central compartment having its floor above the floor of said end passage-ways and being provided with end windows through which the operator may have a clear view of the track ahead over the roof of the end passage-way.

3. In an electrically-propelled vehicle, the combination of a control system for the motors of the vehicle which includes resistance-sections, a compartment in which said resistance-sections are located, and a sand-box in said compartment so arranged as to be subjected to the heat from said resistance-sections.

4. In an electrically-propelled vehicle, a motor, a controller therefor, resistances adapted to be connected in circuit with said motor, an inclosure for said resistances provided with a ventilating-flue, and a sand-box located in said flue in such a manner as to be subjected to the heat generated by the current flowing through said resistances.

5. In an electric locomotive, a cab structure formed with a chamber in which rheostats or resistance-sections are adapted to be located, said chamber being formed with a ventilating-flue, and a sand-box located in said flue.

In witness whereof I have hereunto set my hand this 4th day of May, 1904.

EDWARD D. PRIEST.

Witnesses:
  BENJAMIN B. HULL,
  HELEN ORFORD.